United States Patent
Olsson

(10) Patent No.: US 8,352,165 B2
(45) Date of Patent: Jan. 8, 2013

(54) METHOD AND SYSTEM FOR OPERATING A COMBUSTION ENGINE BRAKE

(75) Inventor: Göran Olsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 337 days.

(21) Appl. No.: 12/305,396

(22) PCT Filed: Jul. 13, 2006

(86) PCT No.: PCT/SE2006/000876
§ 371 (c)(1), (2), (4) Date: Dec. 18, 2008

(87) PCT Pub. No.: WO2008/008005
PCT Pub. Date: Jan. 17, 2008

(65) Prior Publication Data
US 2009/0187331 A1    Jul. 23, 2009

(51) Int. Cl.
*F01L 13/06* (2006.01)
*F02D 9/06* (2006.01)

(52) U.S. Cl. ......... 701/112; 123/320; 123/321; 123/323

(58) Field of Classification Search .......... 123/323, 123/320, 321, 322; 60/602; 701/112, 101, 701/102, 110
See application file for complete search history.

(56) References Cited

U.S. PATENT DOCUMENTS

| | | | | |
|---|---|---|---|---|
| 4,615,419 A | * | 10/1986 | Gaiser | 188/181 T |
| 5,358,317 A | * | 10/1994 | Cikanek | 303/152 |
| 5,549,371 A | * | 8/1996 | Konaga et al. | 303/152 |
| 5,718,199 A | * | 2/1998 | Hu et al. | 123/322 |
| 5,879,062 A | * | 3/1999 | Koga et al. | 303/152 |
| 5,882,093 A | * | 3/1999 | Enomoto et al. | 303/152 |
| 5,987,888 A | * | 11/1999 | Weisman et al. | 60/612 |
| 6,018,948 A | * | 2/2000 | Schnaibel et al. | 60/602 |
| 6,062,025 A | * | 5/2000 | Okada et al. | 60/602 |
| 6,085,524 A | * | 7/2000 | Persson | 60/602 |
| 6,085,526 A | | 7/2000 | Bischoff | |
| 6,094,611 A | * | 7/2000 | Gil | 701/57 |
| 6,122,588 A | * | 9/2000 | Shehan et al. | 701/93 |
| 6,279,531 B1 | * | 8/2001 | Robichaux et al. | 123/339.19 |
| 6,401,026 B2 | * | 6/2002 | Robichaux et al. | 701/110 |
| 6,418,719 B2 | | 7/2002 | Terry et al. | |
| 6,543,226 B1 | * | 4/2003 | Bischoff et al. | 60/602 |
| 6,655,754 B2 | * | 12/2003 | Crombez et al. | 303/152 |
| 6,810,850 B2 | | 11/2004 | Anderson et al. | |

(Continued)

OTHER PUBLICATIONS

International Search Report for corresponding International Application PCT/SE2006/000876.

*Primary Examiner* — Stephen K Cronin
*Assistant Examiner* — Raza Najmuddin
(74) *Attorney, Agent, or Firm* — WRB-IP LLP

(57) ABSTRACT

A method and system for operating a combustion engine brake especially for a heavy vehicle like a truck or a bus is disclosed. By detecting a brake torque value which is delivered by the combustion engine brake for braking the vehicle, and, if the amount of the difference between a demanded brake torque value and the delivered brake torque value exceeds a predetermined first limit value, by operating the combustion engine brake by means of at least one additional or alternative second operating parameter which is selected in order to create a corrected brake torque value, a considerably improved accuracy, efficiency and/or reliability of the combustion engine brake can be obtained.

23 Claims, 3 Drawing Sheets

U.S. PATENT DOCUMENTS

| | | | |
|---|---|---|---|
| 6,819,995 B2 * | 11/2004 | Bellinger | 701/53 |
| 6,876,916 B2 * | 4/2005 | Cullen | 701/102 |
| 6,883,318 B2 * | 4/2005 | Warner et al. | 60/602 |
| 6,951,198 B1 * | 10/2005 | Megli et al. | 123/321 |
| 7,076,952 B1 * | 7/2006 | Vetrovec | 60/605.1 |
| 7,201,140 B2 * | 4/2007 | Megli et al. | 123/322 |
| 7,434,398 B2 * | 10/2008 | Olsson et al. | 60/602 |
| 2006/0041337 A1 * | 2/2006 | Augsburger et al. | 701/1 |
| 2007/0192010 A1 * | 8/2007 | Carlstrom et al. | 701/70 |
| 2010/0168976 A1 * | 7/2010 | Andrasko et al. | 701/70 |
| 2011/0011081 A1 * | 1/2011 | Quigley et al. | 60/600 |

* cited by examiner

METHOD AND SYSTEM FOR OPERATING A COMBUSTION ENGINE BRAKE

BACKGROUND AND SUMMARY

The invention relates to a method and system for operating a combustion engine brake especially in a heavy vehicle like a truck or a bus. The invention further relates to an engine control unit which is adapted for operating a combustion engine according to this method.

EP 1 281 841 discloses an engine compression release brake system and a method for operating the same in which an electronic control unit varies the braking power level of the brake system for an internal combustion engine in response to a signal generated by a sensor for sensing an operation condition like for example a vehicle load, speed, grade or brake pedal position. By controlling the amount of braking on the basis of the vehicle needs, especially a noise reduction shall be achieved.

It is desirable to further improve the accuracy or efficiency or reliability of a combustion engine brake and to provide a method and system for operating such a brake in an optimized manner.

It is also desirable to provide a method and system for operating a combustion engine brake by which a demanded brake torque can be delivered more accurately.

According to an aspect of the present invention, a method is provided for operating a combustion engine brake by means of at least one first operating parameter value which is selected in order to create a demanded brake torque value, comprising a step of detecting a brake torque value which is delivered by the combustion engine brake for braking the vehicle, and, if the amount of the difference between the demanded brake torque value and the delivered brake torque value exceeds a predetermined first limit value, the combustion engine brake is operated by means of at least one second operating parameter value which is selected or controlled in order to create a corrected brake torque value.

The second operating parameter can be an additional and/or an alternative operating parameter in relation to the first operating parameter, and/or it can be the same parameter as the first operating parameter but having another operating parameter value which e.g. is accordingly adjusted or selected or controlled.

The term "amount" of the difference is to be understood in this disclosure as the value without a sign, i.e. independently of a positive or a negative value of the difference.

According to another aspect of the present invention, a system is provided for operating a combustion engine brake comprising an engine control unit for conducting the above method.

One advantage of this solution is, that variations of the brake power due to variations e.g. of the ambient temperature, operating conditions, manufacturing tolerances etc. can be minimized or compensated. Furthermore, changes in the brake power which are caused for example by wear or degradation of certain components of the vehicle, especially of the combustion engine brake, can be compensated as well by the method and system according to the invention.

Another advantage of this solution is, that the method and system can be used as well to monitor operating parameters of the combustion engine brake and to detect faults or realize diagnostics in the related components of the combustion engine by evaluating variations or deviations of these parameters.

BRIEF DESCRIPTION OF THE DRAWINGS

Further details, features and advantages of the invention are disclosed in the following description of exemplary and preferred embodiments of the invention in connection with the drawings in which shows.

DETAILED DESCRIPTION

Figure 1:
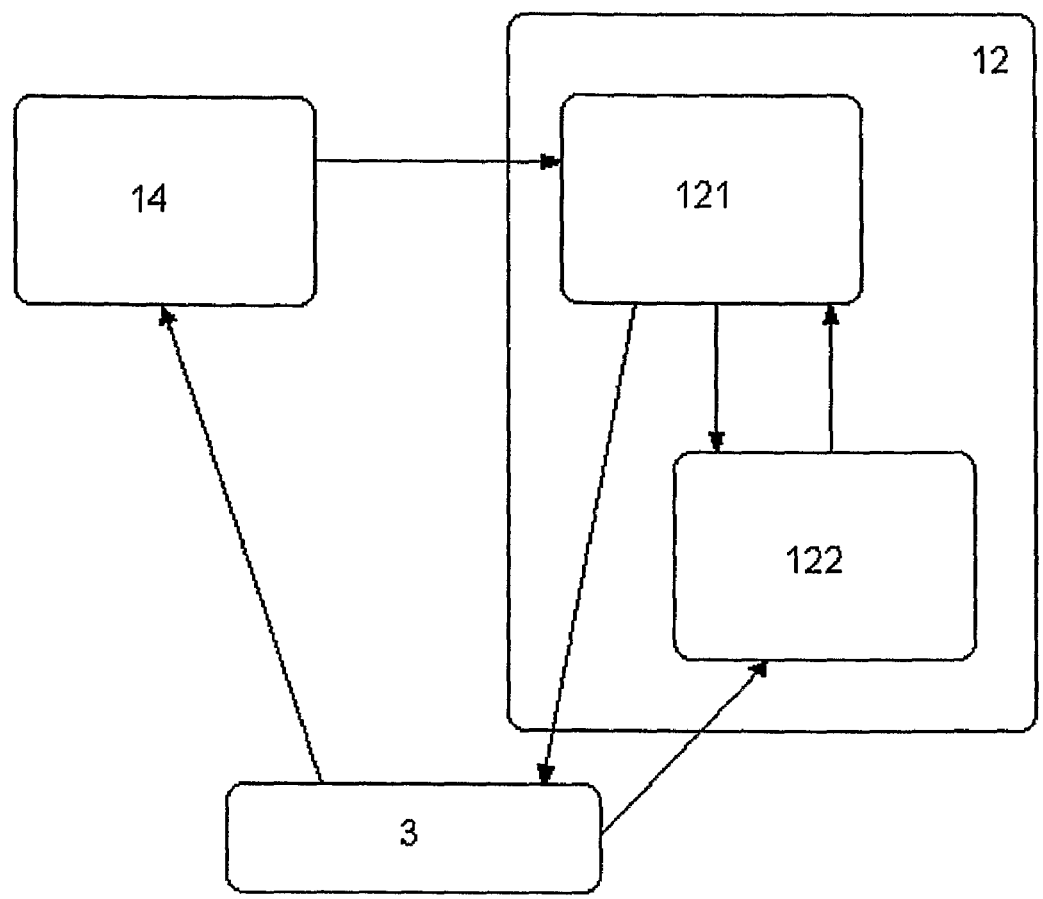
FIG. 1 a schematic block diagram of substantial components of a system according to the invention.

FIG. 1 schematically shows a vehicle control unit (VECU) or a retarder control unit or any other control unit on board of the vehicle (like RCU etc.) 14, an engine control unit (ECU) 12 comprising a first software unit 121 and a second software unit 122 and a torque sensor 3 for detecting an actual brake torque value delivered or exerted by the combustion engine brake.

The vehicle control unit 14 is usually positioned in the driver cabin of the vehicle and is provided in a known manner for operating or controlling vehicle components, and it usually comprises a retarder control unit as well. The engine control unit 12 is provided for operating the combustion engine in a known manner.

The torque sensor 3 is preferably positioned in the drive line of the vehicle, for example between the combustion engine and a gearbox, or it can be located at other places as well, like for example at a propeller shaft or a driving axle or any power transmitting shaft of the combustion engine.

It is generally known, that especially in case of heavy vehicles like trucks, the braking of the vehicle is supported or under certain conditions exclusively accomplished by activating and operating a combustion engine brake.

Such a braking of the vehicle is initiated by the vehicle control unit 14 upon receiving a brake command executed by the driver or automatically by certain events or conditions like a vehicle fault detection, the exceeding of a certain velocity, etc.

The vehicle control unit 14 then calculates in dependence of such a brake command a brake torque which is to be delivered by the combustion engine brake in order to brake or support braking of the vehicle. This calculated brake torque is transmitted in the form of an amount or a value X [Nm] of a demanded brake torque to the engine control unit 12.

The engine control unit (ECU) 12, especially a first software unit 121, evaluates the received demanded brake torque value and activates the combustion engine brake, for example by activating a compression brake and/or by activating an exhaust brake, by selecting at least one related first operating parameter and controlling its value in order to deliver the demanded brake torque value.

The compression brake can be activated e. g. by controlling the engine valve system such that during the compression stroke and/or during the exhaust stroke a certain back—or counter gas pressure is created within the cylinders which is effective against the movement of the pistons.

The exhaust brake can be activated especially in addition to the compression brake, by closing a (butterfly—) shutter of an exhaust gas pressure governor (EPG) at a turbocharger turbine to a predefined or determined position (or force/pressure balance), or any other shutter which gives a predetermined leakage by a predetermined position, in order to create a certain back pressure in the exhaust system.

Generally, the following (first and second) parameters and their amounts or values can be selected, adapted or controlled for activating the exhaust brake: the boost pressure and its amount (by means of an air dump valve control), the pre- and/or after turbine pressure and its amount (by means of e.g. a butterfly shutter before or after the turbine), the turbine speed and its amount, the variable turbine geometry (VTG) and its position, and others.

In order to obtain such a value of the delivered brake torque, which is at least substantially equal to the value of the demanded brake torque, the first software unit 121 comprises a storage in which for a plurality of the above parameters and their amounts/values each an expected value of the brake torque is stored which is obtained if the related parameter and its amount/value is selected and the related component of the combustion engine is accordingly operated or controlled therewith.

The expected brake torque values are preferably determined for a plurality of the above parameters and their amounts/values once by experiments with one or more test engines during manufacturing of the combustion engine brake system and are then stored e. g. in the form of a table comprising said parameters and their values and the each resulting brake torque value (i. e. an engine data set of parameter-values and related brake torques).

The first software unit 121 selects from this engine data set at least one appropriate first operating parameter and an amount or value therefore such that the resulting expected brake torque value is at least substantially equal to the demanded brake torque value. Then the engine control unit 12 controls or adjusts the corresponding components of the compression brake and/or the exhaust brake according to the at least one first operating parameter and its value as explained above. Simultaneously, the selected at least one first parameter and its value is transmitted together with the expected brake torque value to a second software unit 122.

Usually, however, the delivered brake torque which is actually obtained by the selected at least one first parameter and its value may deviate considerably from the expected (or demanded) brake torque due to manufacturing tolerances or due to certain environment conditions, especially temperature or altitude, or due to wear which may vary over time, and other vehicle conditions like e. g. actual turbine speed, boost pressure, back pressure etc. in various combinations.

In order to compensate these effects and conditions and to create a more accurate value of the delivered brake torque with respect to the demanded brake torque, at least one torque sensor 3 is provided for detecting the value of the real or actually delivered brake torque which is obtained by the selected at least one first operating parameter and its value. On the basis of the detected value of the delivered brake torque, a corrected value of the brake torque is generated by the combustion engine brake.

More in details, the detected brake torque value is submitted from the sensor 3 to the vehicle control unit 14. According to a first alternative, the detected brake torque value is compared with the demanded brake torque value. If the amount of the difference (i.e. independently of the sign of the difference) between both exceeds a preset value, the vehicle control unit 14 generates an accordingly increased or decreased brake torque demand value in order to decrease the said amount of the difference.

However, according to a preferred second alternative, the detected brake torque value is submitted to the engine control unit 12, where it is compared with the brake torque value which was expected for the selected at least one first parameter and its value by the first software unit 121. Alternatively, the detected brake torque value is compared with the value of the brake torque demanded by the vehicle control unit 14 (which is substantially the same as explained above).

This comparison is preferably made by the second software unit 122.

If the amount of the difference between both brake torque values exceeds a preset first limit value, corrective actions are initiated, so that a closed loop for controlling the brake torque value generated by the combustion engine brake is provided.

The correction of the delivered brake torque value can be accomplished by at least one second operating parameter and a value thereof, which second parameter can be a variation of one (or more) of the selected at least one first parameter, especially by increasing or decreasing at least one of the values of the at least one first parameter by a predetermined step by means of the second software unit 122, and subsequently submitting the varied (i.e. second) at least one parameter value to the first software unit 121 (or another appropriate unit of the engine control unit 12) in order to control the related components and to create on the basis of the varied at least one second operating parameter and its value a new corrected value of the delivered brake torque.

Alternatively or additionally, at least one other operating parameter than the first parameter (and a related appropriate value) can be selected especially from the engine data set and used as the second parameter-value as well.

This loop procedure can be repeated until the amount of the difference (i.e. the value of the difference without a sign) between the actual value of the delivered brake torque (detected by the torque sensor 3) and the value of the brake torque demanded by the vehicle control unit 14 is smaller than the predetermined first limit value (e.g. approximately zero).

Figure 2:
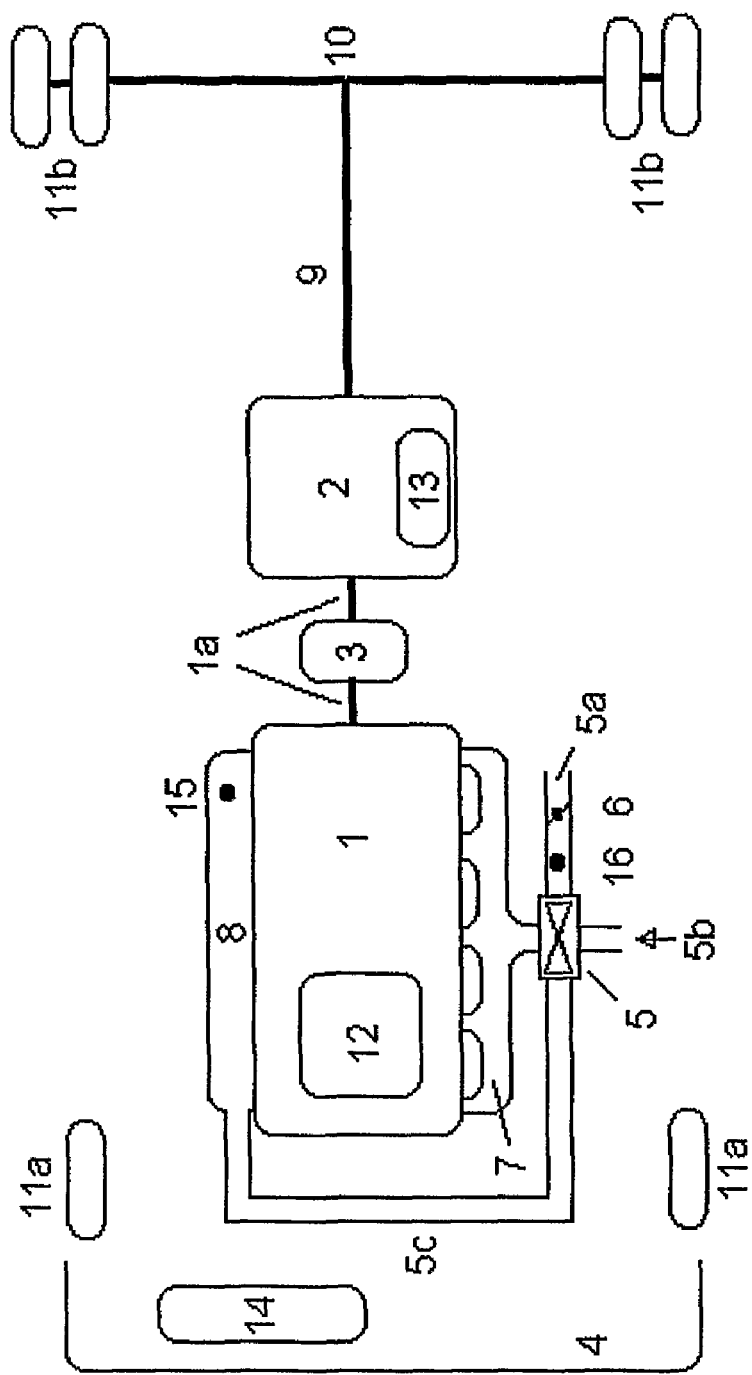
FIG. 2 a schematic and more detailed block diagram of a system according to the invention, and of related components of a vehicle.

FIG. 2 schematically shows some components of a vehicle, namely a cabin 4 for the driver, front wheels 11a, rear wheels 11b and a combustion engine 1. The output of the combustion engine 1 is connected via a connecting shaft 1a with a gearbox 2 which usually comprises a transmission control unit 13 and which drives via a propeller shaft 9 and a driving axle 10 the rear wheels 11b in a known manner.

A torque sensor 3 is positioned in the driving line of the vehicle, e.g. at the connecting shaft 1a. The torque sensor 3 can be positioned alternatively at the propeller shaft 9 or at the driving axle 10 or any power transmitting shaft of the combustion engine as well. Furthermore, either a real torque sensor, or a virtual torque sensor can be used. Such a virtual sensor is for example disclosed in U.S. Pat. No. 5,771,483.

An engine control unit 12 is provided for controlling the combustion engine 1. The combustion engine 1 comprises an inlet manifold 8 with an inlet pressure sensor 15. An exhaust manifold 7 is connected with a turbocharger turbine 5 with a fixed or variable geometry for driving the same.

The turbocharger turbine 5 comprises an exhaust pipe 5a which includes a variable shutter 6 for controlling the back pressure of the exhaust gases (in case of a variable geometry, the variable shutter 6 is usually not necessary). Preferably, an exhaust pressure sensor 16 is located within the exhaust pipe 5a as well. Furthermore, as generally known, the turbocharger turbine 5 comprises an air inlet 5b and an outlet pipe 5c for supplying compressed air to the inlet manifold 8 of the combustion engine 1.

Finally, a vehicle control unit 14 comprising a retarder control unit is positioned within the cabin 4.

When the driver activates his brake pedal or releases his gas pedal or activates a brake switch (or if a brake command is automatically generated for example in dependence on certain environmental or vehicle conditions), the vehicle control unit 14 determines which of the available brake power sources (substantially the wheel brakes and the combustion engine brake) has to generate what amount of brake power or brake torque. This is usually decided again on the basis of certain environmental and vehicle conditions and the amount of total brake power to be generated, e. g. how strong the brake pedal is activated by the driver.

The amount of brake power which is to be generated by the combustion engine 1 is transmitted to the engine control unit 12 in the form of a demanded brake torque value. As explained above with reference to FIG. 1 the first software unit 121 selects from the stored engine data set those at least one first operating parameter and its value which will result according to the stored engine data set in the demanded brake torque.

Then, the selected at least one first parameter and its value is implemented for example by moving the vanes in a variable geometry turbo charger 5 to the related position and/or closing a shutter 6 in the exhaust pipe 5*a* of the turbocharger turbine 5 (according to the stored data) in order to create a brake torque by means of the combustion engine 1.

The actually delivered brake torque value which is exerted e. g. on the connecting shaft 1*a* is detected by the brake torque sensor 3 and transmitted to the second software unit 122 and to the vehicle control unit 14.

Figure 3:
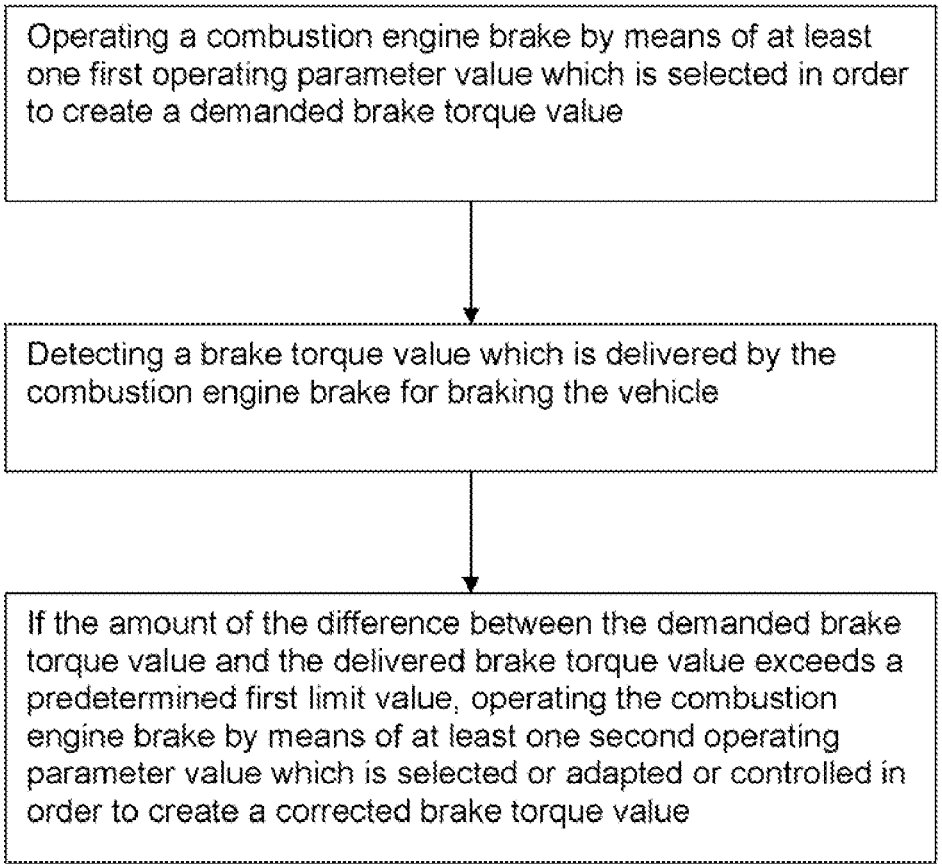
FIG. 3 is a flow diagram showing steps in a method according to an aspect of the present invention.

In the second software unit 122 the actually delivered brake torque value is compared (as seen in the flow chart of FIG. 3) with the expected (or demanded) brake torque value as explained above. If the amount of the difference between both exceeds a predetermined or preset first limit value, the second software unit 122 varies according to a first alternative the at least one first operating parameter value which has been used by the first software unit 121 and transmits this at least one value as an at least one second parameter value to the first software unit 121 (or another unit of the engine control unit 12) so that it again controls the related components of the combustion engine 1 in order to create a corrected value of the delivered brake torque.

According to a second alternative, other operating parameters than the at least one first operating parameter can be selected alternatively or additionally as the at least one second parameter (and its value) as well as explained above.

Then the brake torque is detected again by the torque sensor 3, and the detected brake torque is transmitted again to the second software unit 122. If the amount of the difference between the actual brake torque and the expected or demanded brake torque still exceeds the preset first limit value (e.g. a value of approximately zero), the above loop procedure is repeated.

By this, a closed loop is realized, by which the actual brake torque can be made at least substantially equal to the brake torque which is demanded by the vehicle control unit 14.

Furthermore, the method can be realized as a continuously on-going process in which if e.g. the engine speed changes, also the selected parameter is changed in dependence upon the engine speed.

This method and system has the following further advantages:

By submitting the actually delivered brake torque value (which is detected by the sensor 3) to the vehicle control unit 14 instead of the expected brake torque value determined by the first software unit 121, it is prevented that in case of a fault of the combustion engine brake a brake torque value is considered by the vehicle control unit 14 which is actually not available for braking the vehicle.

Furthermore, an engine diagnostic system can be achieved or amended if the difference between the actually delivered brake torque value and the expected brake torque value exceeds a predetermined second limit value, which is larger than the first limit value, because this can be an indication that the related engine components which have been adjusted on the basis of the selected parameters have a defect or a malfunction.

Furthermore, a self learning system and a self calibration system can be accomplished if either the value of a parameter and/or the value of the expected brake torque (which both are stored in the engine data set), is corrected in the engine data set according to the difference between the actually delivered brake torque value and the expected brake torque value, so that for a next braking of the vehicle, the delivered brake torque is more accurate in relation to the demanded brake torque, and less or no corrective actions have to be made.

By this, the method and system according to the invention can especially be provided for compensating changes in the brake power which are caused for example by wear or degradation of components of the combustion engine brake or other components of the vehicle over time.

Furthermore, the method and the related system has the advantage that not only an increased accuracy for the brake cruise is achieved but also for other system components which rely on the brake torque from the combustion engine. An example is an engine brake system which is used in combination with or instead of other brakes like for example wheel brakes, or in case of a combination of wheel brakes, engine brake and secondary retarder brake. The increased accuracy of the method according to the invention will make control of such brake systems easier and the driver comfort will be improved.

Finally, the brake torque can be measured by means of a torque sensor 3 in the drive line with much more accuracy and reliability than by means of certain other sensors in the combustion engine like for example a pre-turbine pressure sensor (i.e. a sensor for measuring the pressure between the turbine outlet and a shutter) or a pressure or pressure and temperature sensor in the exhaust manifold or after the turbine, because those sensors are usually positioned in a hostile environment which induces the risk that those sensors are clogged or even damaged so that they cannot detect the related sensor values correctly any longer. Furthermore, by such incorrect sensor values, e.g. a too high back pressure can be created which additionally can result in a de-hardening of the nozzles in the fuel injectors.

The method according to an aspect of the present invention can be performed by a computer programmed for use in or conducting a method according to claim 1 connected to the internet and programmed for use in or conducting the method via a program downloaded from the internet. In addition, a computer program product stored on a non-transitory computer readable medium can comprise a program code for use in a method according to an aspect of the present invention.

The invention claimed is:

1. Method for operating a combustion engine brake by means of at least one first operating parameter value which is selected in order to create a demanded brake torque value, comprising
    detecting a brake torque value which is delivered by the combustion engine brake for braking the vehicle, and
    if the amount of the difference between the demanded brake torque value and the delivered brake torque value exceeds a predetermined first limit value, operating the combustion engine brake by means of at least one second operating parameter value which is selected in order to create a corrected brake torque value.

2. Method according to claim 1, wherein the brake torque value which is delivered by the combustion engine brake is detected by means of a real or virtual brake torque sensor.

3. Method according to claim 1, wherein a plurality of first operating parameter values is stored in the form of a table assigning to each parameter value an expected brake torque value which is obtained when the combustion engine brake is operated with the related parameter value.

4. Method according to claim 1, wherein the second operating parameter value is determined from the first operating parameter value by increasing or decreasing its value by at least one predetermined step.

5. Method according to claim 4, wherein the second operating parameter value is stored instead of the first operating parameter value in the table.

6. Method according, to claim wherein the at least one first and/or the at least one second operating parameter and its value is selected from the following group of parameters and parameter values, respectively: the back pressure and its value within the exhaust system of the combustion engine, the boost pressure and its value, the pre- and/or after turbine pressure and its value, the turbine speed and its value, the variable turbine geometry (VTG) and its position.

7. Method for operating a combustion engine brake by means of at least one first operating parameter value which is selected in order to create a demanded brake torque value, comprising
   detecting a brake torque value which is delivered by the combustion engine brake for braking the vehicle, and
   if the amount of the difference between the demanded brake torque value and the delivered brake torque value exceeds a predetermined first limit value, operating the combustion engine brake by means of at least one second operating parameter value which is selected in order to create a corrected brake torque value,
   wherein a fault condition is signaled if the amount of the difference between the demanded brake torque value and the delivered brake torque value exceeds a predetermined second limit value which is larger than the first limit value.

8. System for operating a combustion engine brake comprising an engine control unit for arranged to operate the combustion engine brake by means of at least one first operating parameter value which is selected in order to create a demanded brake torque value, comprising detecting a brake torque value which is delivered by the combustion engine brake for braking the vehicle, and if the amount of the difference between the demanded brake torque value and the delivered brake torque value exceeds a predetermined first limit value, operating the combustion engine brake by means of at least one second operating parameter value which is selected in order to create a corrected brake torque value.

9. System according to claim 8, wherein the brake torque value is detected by means of at least one real or virtual torque sensor which is positioned on a power transmitting shaft of the combustion engine.

10. Engine control unit for controlling a combustion engine, wherein the engine control unit is provided for operating a combustion engine brake by a method according to claim 1.

11. Engine control unit according to claim 10, which is provided as a part of a vehicle control unit.

12. Computer programmed for use in or conducting a method according to claim 1.

13. Computer connected to the interne and programmed for use in or conducting a method according to claim 1 via a program downloaded from the internet.

14. Computer program product stored on a non-transitory computer readable medium, comprising a program code for use in a method according to claim 1.

15. Method for operating a combustion engine brake, comprising:
   receiving a demanded combustion brake torque value;
   selecting at least one first operating parameter value to create the demanded combustion brake torque value,
   detecting a delivered brake torque value which is delivered by operating the combustion engine brake by the first operating parameter;
   comparing the demanded brake torque value and the delivered brake torque value; and
   if a difference between the demanded brake torque value and the delivered brake torque value exceeds a predetermined first limit value, operating the combustion engine brake by means of at least one second operating parameter value which is selected in order to create a corrected brake torque value.

16. Method for operating a combustion engine brake by means of at least one first operating parameter value which is selected in order to create a demanded brake torque value, comprising
   detecting a brake torque value which is delivered by the combustion engine brake for braking the vehicle, and
   if the amount of the difference between the demanded brake torque value and the delivered brake torque value exceeds a predetermined first limit value, operating the combustion engine brake by means of at least one second operating parameter value which is adapted in order to create a corrected brake torque value.

17. Method for operating a combustion engine brake by means of at least one first operating parameter value which is selected in order to create a demanded brake torque value, comprising
   detecting a brake torque value which is delivered by the combustion engine brake for braking the vehicle, and
   if the amount of the difference between the demanded brake torque value and the delivered brake torque value exceeds a predetermined first limit value, operating the combustion engine brake by means of at least one second operating parameter value which is adapted in order to create a corrected brake torque value,
   wherein a fault condition is signaled if the amount of the difference between the demanded brake torque value and the delivered brake torque value exceeds a predetermined second limit value which is larger than the first limit value.

18. System for operating a combustion engine brake comprising an engine control unit for arranged to operate the combustion engine brake by means of at least one first operating parameter value which is selected in order to create a demanded brake torque value, comprising detecting a brake torque value which is delivered by the combustion engine brake for braking the vehicle, and if the amount of the difference between the demanded brake torque value and the delivered brake torque value exceeds a predetermined first limit value, operating the combustion engine brake by means of at least one second operating parameter value which is adapted in order to create a corrected brake torque value.

19. Method for operating a combustion engine brake, comprising:
- receiving a demanded combustion brake torque value;
- selecting at least one first operating parameter value to create the demanded combustion brake torque value,
- detecting a delivered brake torque value which is delivered by operating the combustion engine brake by the first operating parameter;
- comparing the demanded brake torque value and the delivered brake torque value; and
- if a difference between the demanded brake torque value and the delivered brake torque value exceeds a predetermined first limit value, operating the combustion engine brake by means of at least one second operating parameter value which is adapted in order to create a corrected brake torque value.

20. Method for operating a combustion engine brake by means of at least one first operating parameter value which is selected in order to create a demanded brake torque value, comprising
- detecting a brake torque value which is delivered by the combustion engine brake for braking the vehicle, and
- if the amount of the difference between the demanded brake torque value and the delivered brake torque value exceeds a predetermined first limit value, operating the combustion engine brake by means of at least one second operating parameter value which is controlled in order to create a corrected brake torque value.

21. Method for operating a combustion engine brake by means of at least one first operating parameter value which is selected in order to create a demanded brake torque value, comprising
- detecting a brake torque value which is delivered by the combustion engine brake for braking the vehicle, and
- if the amount of the difference between the demanded brake torque value and the delivered brake torque value exceeds a predetermined first limit value, operating the combustion engine brake by means of at least one second operating parameter value which is controlled in order to create a corrected brake torque value,
- wherein a fault condition is signaled if the amount of the difference between the demanded brake torque value and the delivered brake torque value exceeds a predetermined second limit value which is larger than the first limit value.

22. System for operating a combustion engine brake comprising an engine control unit for arranged to operate the combustion engine brake by means of at least one first operating parameter value which is selected in order to create a demanded brake torque value, comprising detecting a brake torque value which is delivered by the combustion engine brake for braking the vehicle, and if the amount of the difference between the demanded brake torque value and the delivered brake torque value exceeds a predetermined first limit value, operating the combustion engine brake by means of at least one second operating parameter value which is controlled in order to create a corrected brake torque value.

23. Method for operating a combustion engine brake, comprising:
- receiving a demanded conibustion brake torque value;
- selecting at least one first operating parameter value to create the demanded combustion brake torque value,
- detecting a delivered brake torque value which is delivered by operating the combustion engine brake by the first operating parameter;
- comparing the demanded brake torque value and the delivered brake torque value; and
- if a difference between the demanded brake torque value and the delivered brake torque value exceeds a predetermined first limit value, operating the combustion engine brake by means of at least one second operating parameter value which is controlled in order to create a corrected brake torque value.

* * * * *